United States Patent
Karlsson

(10) Patent No.: US 10,218,062 B2
(45) Date of Patent: Feb. 26, 2019

(54) WIRELESS TRAIN COMMUNICATION SYSTEM

(71) Applicant: ICOMERA AB, Göteborg (SE)

(72) Inventor: Mats Karlsson, Göteborg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/328,646

(22) PCT Filed: Jul. 1, 2015

(86) PCT No.: PCT/SE2015/050772
§ 371 (c)(1),
(2) Date: Jan. 24, 2017

(87) PCT Pub. No.: WO2016/013968
PCT Pub. Date: Jan. 28, 2016

(65) Prior Publication Data
US 2017/0214128 A1    Jul. 27, 2017

(30) Foreign Application Priority Data
Jul. 24, 2014   (SE) .................................... 1450915

(51) Int. Cl.
*H01Q 1/32* (2006.01)
*H01Q 1/12* (2006.01)
(Continued)

(52) U.S. Cl.
CPC ............. *H01Q 1/32* (2013.01); *H01Q 1/1271* (2013.01); *H01Q 21/28* (2013.01);
(Continued)

(58) Field of Classification Search
CPC .............................. H01Q 1/32; H01Q 1/1271
(Continued)

(56) References Cited

U.S. PATENT DOCUMENTS

| 4,768,037 A | 8/1988 | Inaba et al. |
| 5,132,161 A | 7/1992 | Shibata et al. |

(Continued)

FOREIGN PATENT DOCUMENTS

| EP | 1 175 757 B1 | 1/2005 |
| EP | 2 472 740 A1 | 7/2012 |

(Continued)

OTHER PUBLICATIONS

International Search Report (PCT/ISA/210) dated Oct. 21, 2015, by the Swedish Patent Office as the International Searching Authority for International Application No. PCT/SE2015/050772.

(Continued)

*Primary Examiner* — Dameon E Levi
*Assistant Examiner* — Hasan Z Islam
(74) *Attorney, Agent, or Firm* — Buchanan Ingersoll & Rooney P.C.

(57) ABSTRACT

A method and system for wireless communication between a moving vehicle and a remote server through at least one external mobile network are disclosed. The communication system comprises a plurality of antennas arranged on the train, and at least one router in the train for receiving and transmitting wireless data communication to and from a stationary communication server outside the train through at least one exterior mobile network via the plurality of antennas. The antennas are here window antennas, arranged integrated in or connected to windowpanes of the train. This provides very efficient communication performance, and at the same time requires almost no additional space.

15 Claims, 6 Drawing Sheets

(51) Int. Cl.
*H01Q 21/28* (2006.01)
*H04B 7/0413* (2017.01)
*H04W 16/28* (2009.01)
*H04W 84/00* (2009.01)

(52) U.S. Cl.
CPC .......... *H04B 7/0413* (2013.01); *H04W 16/28* (2013.01); *H04W 84/005* (2013.01)

(58) Field of Classification Search
USPC .................................................. 343/711–713
See application file for complete search history.

(56) References Cited

U.S. PATENT DOCUMENTS

| | | | |
|---|---|---|---|
| 5,418,543 A | 5/1995 | Bolton | |
| 5,670,966 A | 9/1997 | Dishart et al. | |
| 5,926,141 A | 7/1999 | Lindenmeier et al. | |
| 6,043,783 A * | 3/2000 | Endo | H01Q 1/1271 343/713 |
| 6,342,867 B1 * | 1/2002 | Bell | H01Q 19/108 343/795 |
| 6,480,170 B1 | 11/2002 | Langley et al. | |
| 7,106,262 B2 | 9/2006 | Baranski | |
| 7,825,865 B2 | 11/2010 | Ibe et al. | |
| 2005/0285795 A1 * | 12/2005 | Puente Baliarda | H01Q 1/36 343/700 MS |
| 2007/0030857 A1 | 2/2007 | Fulknier et al. | |
| 2007/0097001 A1 * | 5/2007 | Sugimoto | H01Q 1/1271 343/713 |
| 2013/0310021 A1 * | 11/2013 | Bergek | H04W 84/005 455/422.1 |
| 2014/0011442 A1 * | 1/2014 | Dussmann | H04B 7/15528 455/10 |

FOREIGN PATENT DOCUMENTS

| | | |
|---|---|---|
| EP | 2 665 331 A1 | 11/2013 |
| JP | H02274017 A | 11/1990 |

OTHER PUBLICATIONS

Written Opinion (PCT/ISA/237) dated Oct. 21, 2015, by the Swedish Patent Office as the International Searching Authority for International Application No. PCT/SE2015/050772.

Office Action (Communication pursuant to Article 94(3) EPC) dated Nov. 5, 2018, by the European Patent Office in corresponding European Application No. 15 825 254.4-1220, 5 pages.

* cited by examiner

WIRELESS TRAIN COMMUNICATION SYSTEM

TECHNICAL FIELD OF THE INVENTION

The present invention relates to a wireless communication system for trains.

BACKGROUND

The demands on wireless communication capabilities in today's society are increasing rapidly. In particular, fast and easily accessible communication is desired through handheld devices over large areas. It is particularly challenging to achieve such communication for mobile devices which are moving, e.g. when moving over large distances with poor network coverage or when affected by unknown sources of noise interrupting a signal for communication, such as clients moving on trains. In particular, if a client, being for example a mobile phone, moves over large areas the client has to connect to several base stations in order to maintain a sufficient connection for communication.

The mobile nature of a client with respect to the base stations may introduce several potential sources of communication performance degradation. Such sources may derive from complex terrain, competition for available channels, or the source may be an unknown source of noise related to e.g. radio-frequency interference.

At the same time, there is today an increasing demand from passengers to be able to communicate through mobile phones and other handheld terminals when travelling on e.g. trains, and also to be able to get access to the Internet with laptops, PDAs etc. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains.

To this end, solutions using internal networks within the trains, and connection to external network through routers, have been developed. Further, EP 1 175 757 by the same applicant describes a method whereby many of the weaknesses resulting from wireless communication may be overcome through the concurrent use of multiple links, including both wired and wireless technologies. However, the aforementioned solution is often insufficient to obtain an optimal transmission performance. Trains and other moving vehicles often pass through areas with bad radio coverage, and present solutions are often unable to handle the required traffic.

At the same time, there has been a trend towards trains moving at higher and higher speed, such as TGV and the like, and also towards larger and larger trains. The higher speed provides increase strain on the wireless communication. Further, larger trains, such as double decker or bi-level trains; provide less space for antennas on the roof. The available space is often very limited, or even non-existent. Further, high-voltage cables are often provided along the train roof, making the possible placement of antennas even more restricted. To this end, antennas are often confined to less suitable locations, such as in between carriages, at locations having no line-of-sight at both sides of the train, etc. This degrades the antenna performance, and hence the overall performance of the wireless communication system.

There is therefore a need for an improved wireless communication system for moving vehicles, and in particular trains, which provides improved radio communication performance and an improved communication system.

SUMMARY OF THE INVENTION

It is therefore an object of the present invention to provide a method for wireless communication and a wireless communication system for trains which alleviates all or at least some of the above-discussed drawbacks of the presently known systems.

This object is achieved by means of a train wireless communication method and system as defined in the appended claims.

According to a first aspect of the present invention, there is provided a wireless communication system for a train, comprising:

a plurality of antennas arranged on the train;

at least one router in the train for receiving and transmitting wireless data communication to and from a stationary communication server outside said train through at least one exterior mobile network via said plurality of antennas;

wherein the antennas are window antennas, arranged integrated in or connected to window panes of the train.

It has been found by the present inventor that windows antennas works very well on trains, and efficiently solves or alleviates many or all of the above-discussed problems.

The "router" is a networking router, which is a machine that forwards data packets between computer networks, on at least one data link in each direction. The router may be a mobile access router, and preferably a mobile access and applications router. The router is preferably at least partly responsible for making the evaluation of quality and assignment of data streams.

Window antennas on trains are facing in the right direction towards external base stations, hence enabling direct line of sight, and very efficient radio communication. Further, window antennas require essentially no additional space, since they are connected to or integrated in the windows. There is also no conflict with high voltage lines, etc. Still further, several antennas may be arranged relatively close to each other, thereby limiting the need for costly wiring and the like, but still adequately separated to enable MIMO, and other multiple antenna communication technologies.

Window antennas are per se known, and are commonly used on cars for reception of FM and AM broadcast radio, etc. Such antennas are e.g. disclosed in U.S. Pat. Nos. 5,418,543, 4,768,037, 5,926,141, 7,106,262, 5,132,161, 6,480,170, 7,825,865 and 5,670,966. Despite the fact that such antennas have been known and used for decades, window antennas have, as far as is presently known, never been used on trains. It has now been realized by the present inventor not only that similar antenna technology can also be used in trains, but also that this provides new and unexpected advantages. The practical realization of the antennas may be made in accordance with any of these references, or other previously known window antennas, and all of said documents are hereby incorporated by reference. The antennas may also be made more or less transparent and invisible, thereby not affecting the normal use of the windows.

Windows on train are by necessity provided with a heat resistant layer, such as a metalized outer layer. This hinders communication between mobile devices inside the train and external communication systems. However, it has been found by the present inventor that such heat resistant layers have a very limited effect on the performance of window antennas. Further, to the extent that the heat resistant layers would limit the communication performance of the antennas, this may be remedied by arranging the antennas at limited areas of the window not being provided with heat resistant layers, by arranging the antennas in layers outside the heat resistant layers, or the like. This is particularly an option when using laminated windows, providing several intermediate layers in which antennas and heat resistant layers may be provided.

Preferably, the window antennas are distributed over at least two windows on each side of the train. This makes it possible to provide adequate separation of the antennas, e.g. for use in MIMO or other multiple antenna technologies.

If is further preferred that at least two, and preferably three or four, antennas are provided on each windowpane. This makes it possible to arrange the antennas relatively close to each other, thereby reducing the need for costly wiring and the like.

It is also preferred that at least 6 antennas are provided on each side of the train, and preferably at least 10 antennas on each side. The train communication system preferably comprises multiple modems, connecting to different operators, using different communication technologies, and the like. For example, each modem may be connected to multiple antennas, and the antennas of different modems may be arranged separated from each other. For example, when using two modems A and B, the antennas related to each modem, a and b, may be arranged In the sequence of a b a b . . . , and if three modems A, B and C are used, the corresponding antennas a-c may be arranged in the sequence a b c a b c . . . , etc, as seen in the travel direction of the train. This enables an adequate separation between each antenna group (a, b, . . . ) and also an overall compact solution, with a relatively short distance between each antenna.

In case many modems are used, the modems may be connected to several SIMs in a SIM pool. Hereby, the router for providing data communication between an internal LAN and external WANs may comprise, or be connected to, a plurality of modems for communication with the external WANs, and comprise a subscriber identity module (SIM) pool including a plurality of SIMs, and a controller capable of periodically assigning SIMs within the SIM pool to any one of the modems. The SIMs may be related to operators in different countries, whereby the controller is arranged to assign SIMs within said SIM pool to the modems in dependence on in which country the vehicle is currently located.

Preferably, pairs of antennas are provided on each side of the train, so that antennas are facing both lateral directions seen from the train direction of travel. The pairs of antennas on opposite sides of the train may be connected to each other by means of hybrid couplers, thereby enabling use of the antennas on both sides of the train simultaneously by each modem.

However, in an alternative solution, the antennas on opposite sides of the train may be operated separately from each other, by separate modems. This solution has been found very efficient, providing improved, overall communication performance of the system.

The arrangement of antennas on windows in accordance with the present invention makes it relatively easy to provide a large number of antennas, which is very efficient for realization of massive MIMO and bean forming. Massive MIMO may also be referred to as Large-Scale Antenna Systems, Very Large MIMO, Hyper MIMO, Full-Dimension MIMO and ARGOS. Massive MIMO may use more than 50 antennas/antenna elements, such as 64 antennas, or even more than 100 antennas/antenna elements, such as 128 or 256 antennas. Massive MIMO typically uses a large number of service-antennas over active terminals and time division duplex operation. Extra antennas help by focusing energy into ever-smaller regions of space to bring huge improvements in throughput and radiated energy efficiency. Other benefits of massive MIMO include the extensive use of inexpensive low-power components, reduced latency, simplification of the media access control (MAC) layer, and robustness to intentional jamming. Massive MIMO is per se known, but has previously been difficult to realize on trains, due to the many constraints regarding where and how antennas can be arranged on the roofs. However, this is efficiently solved by means of the window antennas of the present invention. Beamforming may be used in connection with MIMO or massive MIMO, and also in combination with many other techniques. In beamforming, the directionality of transmitted radiation is controlled by controlling several antennas/antenna elements independently, and in particular by controlling the phase and or relative amplitude of the signal at each transmitter/antenna element. Again, the present system using window antennas may incorporate very many antennas/antenna elements, and lends itself very efficient for realization of beamforming techniques.

The router is preferably connected through a plurality of exterior mobile networks, which are simultaneously useable. Also, the router is preferably arranged to communicate with the communication server on at least two different data links (communication routes) having different characteristics, and to automatically separate the communication traffic between said data links based on the evaluation. The communication can be automatically optimized based on the evaluation, and also optionally on other conditions, such as price, speed, latency, etc. Thus, in addition to the evaluation, prioritizing and assignments may be made based on other static or dynamic parameters, such as signal strength and the like. Such further optimizations are per se known from EP 1 175 757 by the same applicant, said document hereby incorporated by reference. An automatic selection is then made among the available data links to use the most efficient combination. Hence, a seamless distribution of the data among the different data links is obtained. The use of window antennas is highly suitable for such systems, since it allows the use of multiple, adequately separated antennas.

The router may use any available data links, such as two or more of e.g. GSM, Satellite, DVB-T, HSPA, EDGE, 1X RTT, EVDO, LTE, WiFi (802.11) and WiMAX: and combine them into one virtual network connection. In particular, it is preferred to use data links provided through wireless wide-area network (WWAN) communication technologies.

According to another aspect of the invention, there is provide a method for wireless communication between a train and a remote server through at least one external mobile network, comprising:

providing a plurality of antennas;

arranging the antennas as window antennas, arranged integrated in or connected to windowpanes of the train; and providing at least one router in the train for receiving and transmitting wireless data communication to and from a stationary communication server outside said train through said at least one exterior mobile network via said plurality of antennas.

With this aspect of the invention, similar advantages and preferred features are present as in the previously discussed first aspect of the invention.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIG. 2a-2d are schematic illustrations of some alternative realizations of window antennas in accordance with embodiments of the present invention, in which FIGS. 2a and 2b show schematic side views of windows provided with window antennas, and FIGS. 2c and 2d show schematic cross-sectional views of other embodiments of windows provided with window antennas.

DETAILED DESCRIPTION OF PREFERRED EMBODIMENTS in the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as busses and the like.

Figure 1:
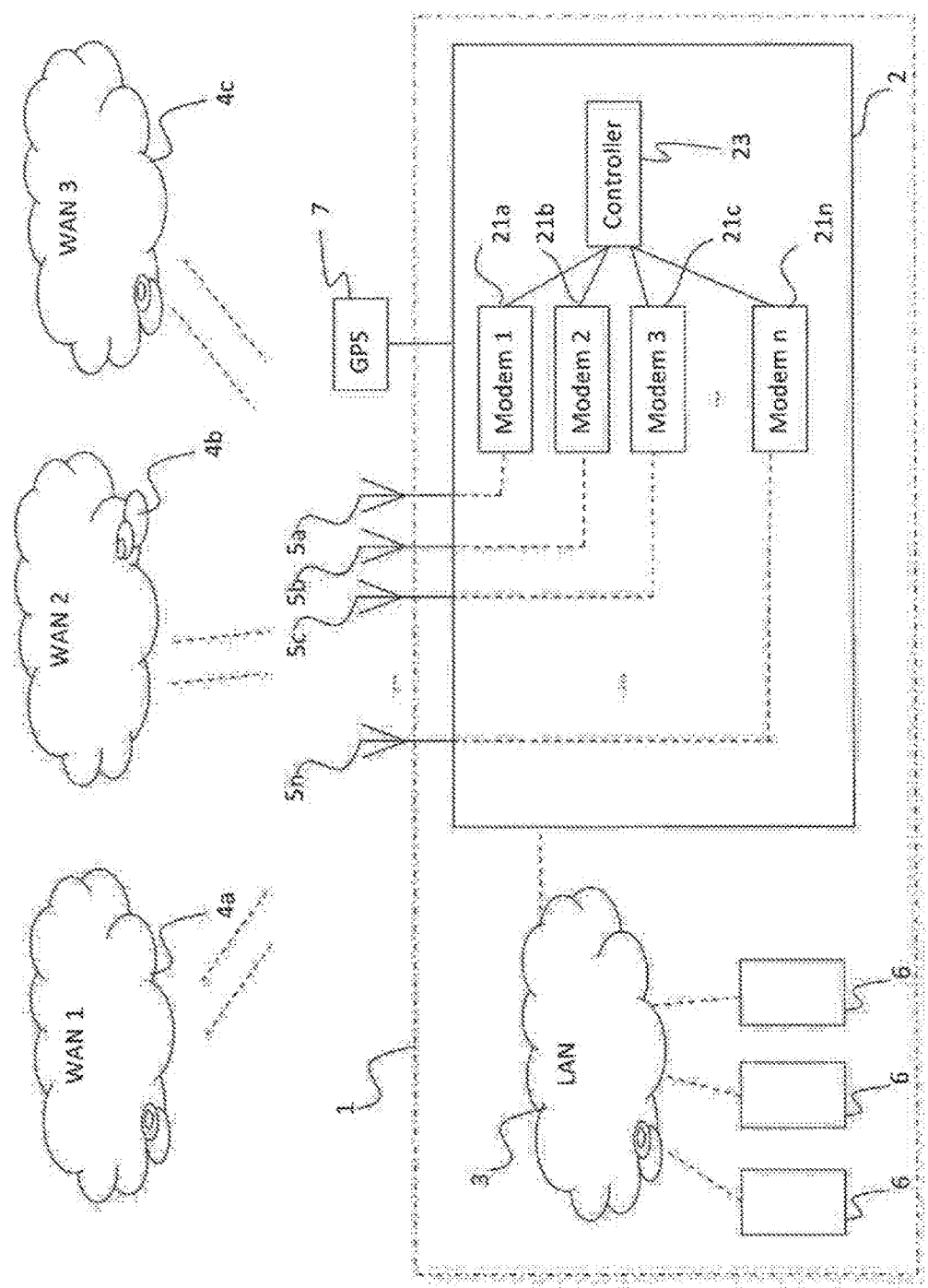
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several antennas 5 a-n arranged as window antennas on window panes of the train. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router comprises a plurality of modems 21a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The window antennas may be realized in various ways, and e.g. in the same way as previously known window antennas for cars, as has been discussed in the foregoing. However, some particular realizations suitable for trains will be discussed in the following.

Figure 2A:
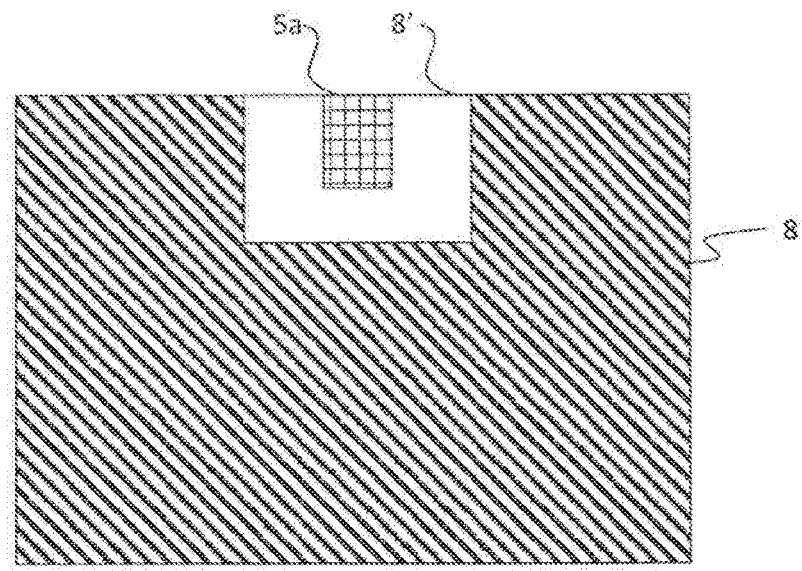
Figure 2B:
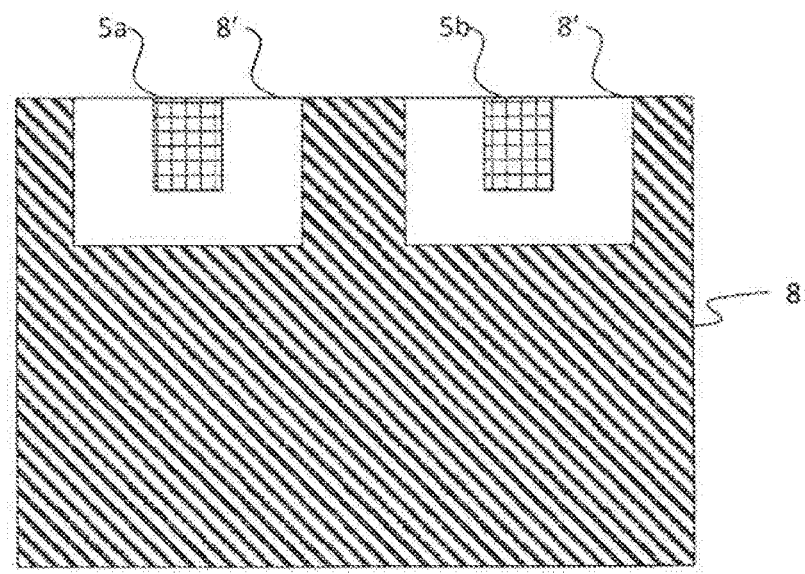

In FIG. 2a, a realization is illustrated in which the heat resistant layer of the window 8 is omitted in a limited area 8'. In this area, a window antenna 5a is provided, either as a surface mounted antenna, arranged on the inside or outside of the window, or integrated in an intermediate layer between two or more glass layers. In FIG. 2a, only one antenna is provided in the window. However, several antennas may be arranged within the same windowpane. FIG. 2b schematically illustrates an embodiment having two antennas, 5a and 5b, arranged in the same window. Naturally, three, four or even more antennas may also be arranged within the same window, depending on the size of the window, and the need for separation between the antennas.

Figure 2C:
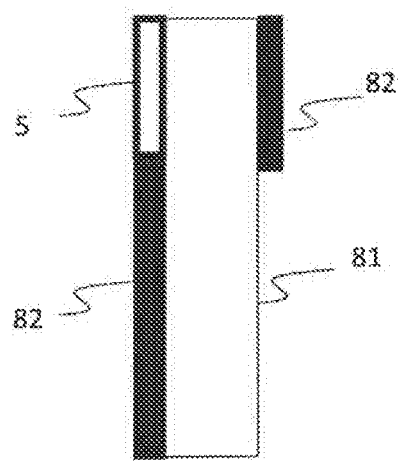
Figure 2D:
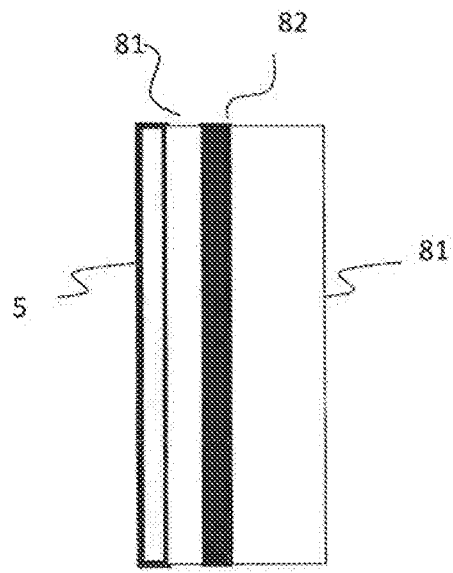

In case a heat resistant layer is needed over the entire window, this may be obtained in various ways. For example, such a solution may be realized as schematically illustrated in FIG. 2c. Here, a heat resistant layer 82 is arranged on the exterior surface of the glass layer 81, apart from in a limited area. In this limited area, an antenna 5 is provided. Behind the antenna, and covering the limited area in which the exterior heat resistant layer is not provided, an additional heat resistant layer 82 may be provided, e.g. arranged on the interior side of the glass layer 81. It is also possible to arrange the heat resistant layer and the antenna in different layers separated by several glass layers 81, in a laminated structure. Such an embodiment is schematically illustrated in FIG. 2d, in which the antenna 5 is arranged in an exterior layer, on a first glass layer 81, and behind this there is a heat resistant layer 82, and an interior glass layer 81. Naturally, more than two glass layers may be provided, such as an exterior glass layer.

In case the antenna is arranged exterior in relation to a heat resistant layer, this also provides protection towards the inside, since the heat resistant layer will in this case also lower the amount of radiation being transmitted into the train.

Figure 3A:
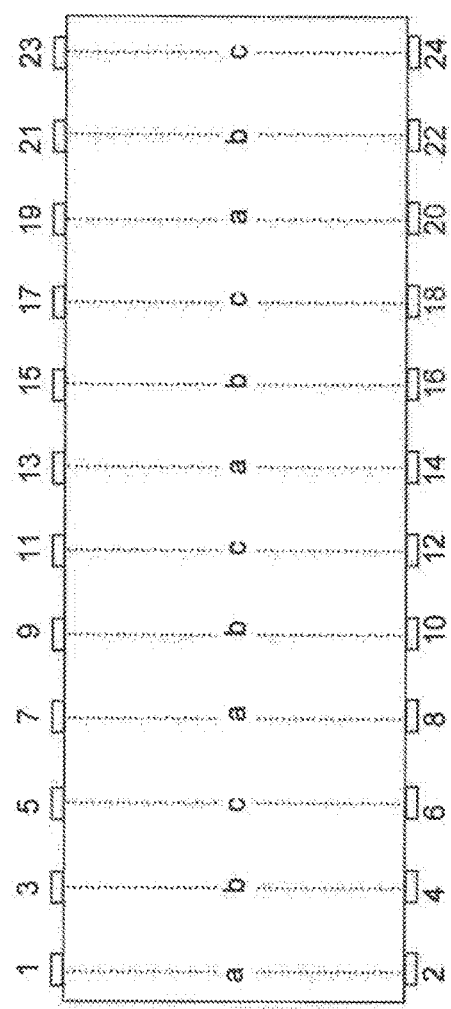
FIGS. 3a-3c are schematic illustrations of multiple antenna arrangements in accordance with embodiments of the present invention, in which each show a schematic wiring layout, and FIGS. 3a and 3b also illustrate schematic location of the window antennas, seen in a top view of the train carriage.
Figure 3A:
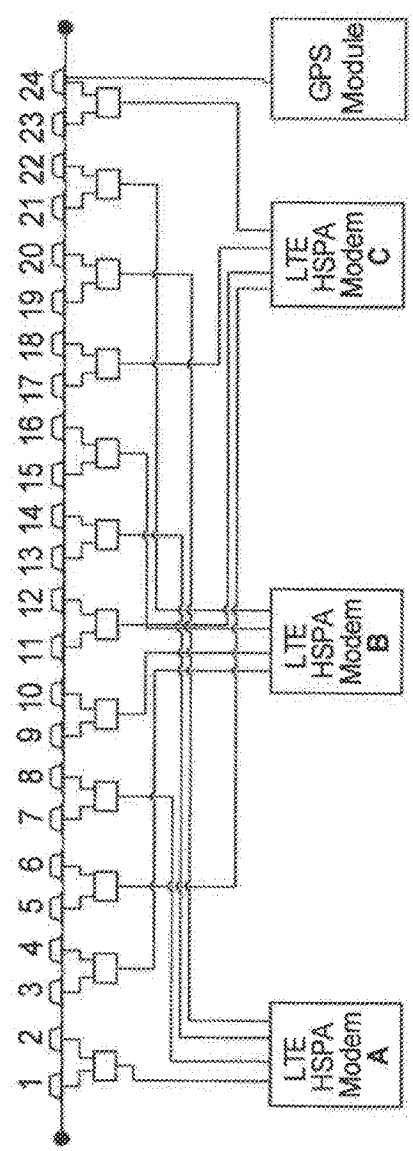

In one embodiment, several antennas, connected to different modems, are arranged along the side of the train, and pair wise connected. The antennas may be connected by means of hybrid couplers. Such a system is schematically illustrated in FIG. 3a. Here, three modems A-C are provided, and each connected to several pairs of antennas, to enable communication through various communication technologies, such as LTE and HSPA. One of the antennas may also be connected to a GPS module.

The antennas are arranged in pairs, separated in the travel direction of the train. Preferably, the antennas assigned to different modems are arranged separated from each other in a sequential fashion. In this embodiment, the antennas a-c, assigned to modems A-C, respectively, are arranged in the order a b c a b c a b c a b c. This makes a total of 24 antennas, 12 on each side, and four antennas on each side assigned to each modem. However, it is naturally also possible to use more or fewer modems, and more or fewer number of antennas assigned to each modem.

Figure 3B:
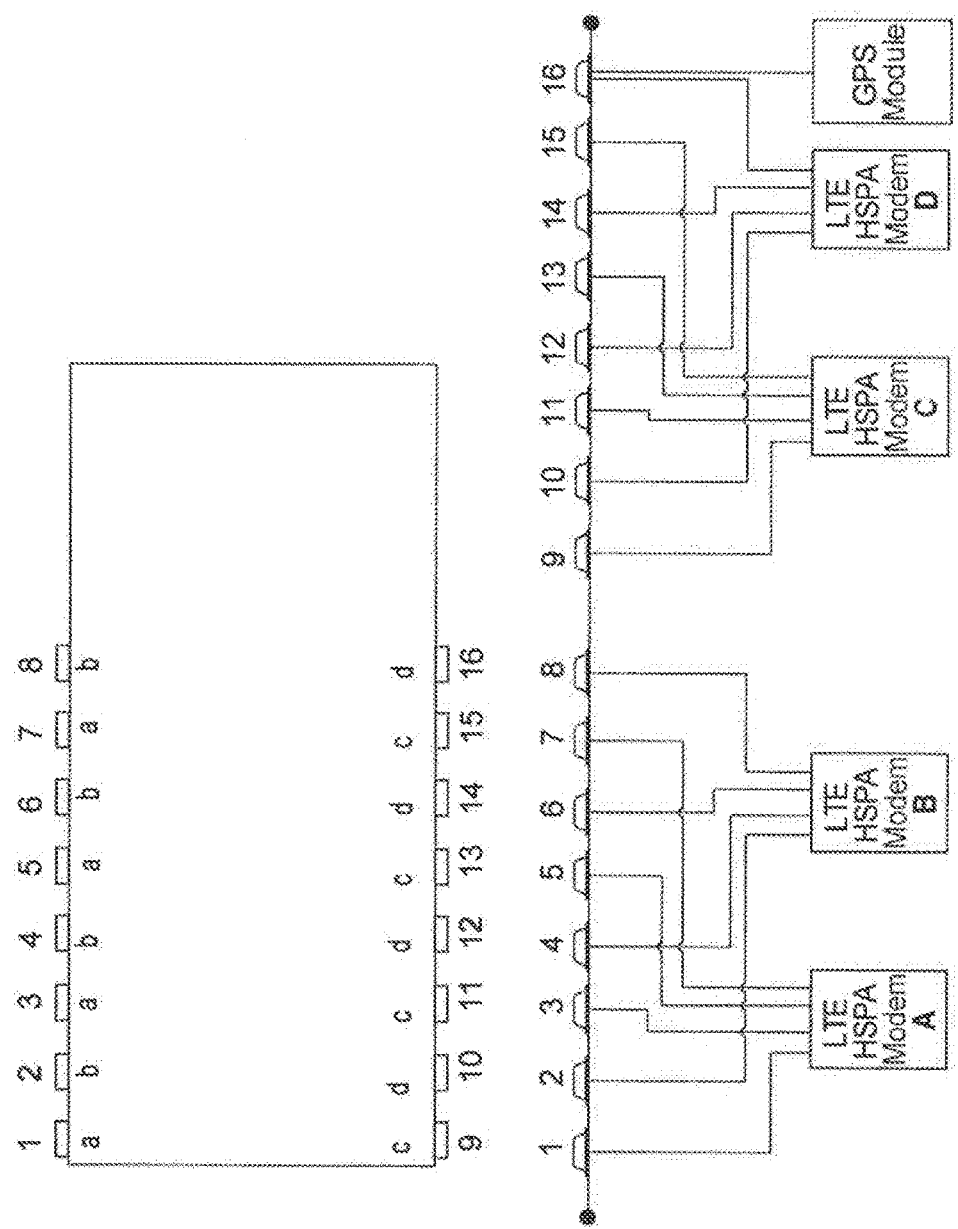

In an alternative embodiment, separate modems are assigned to the antennas on the different sides of the train. Such an embodiment is schematically illustrated in FIG. 3b. Here, two modems, A and B are operating on one side of the train, and two other modems, C and D, are operating on the opposite side of the train. Again, four antennas are assigned to each modem, and again the antennas are arranged in an interleaved manner. Thus, the order of the antennas on a first side of the train is a b a b a b a b, and on the other side of the train, the corresponding order is c d c d c d c d.

Figure 3C:
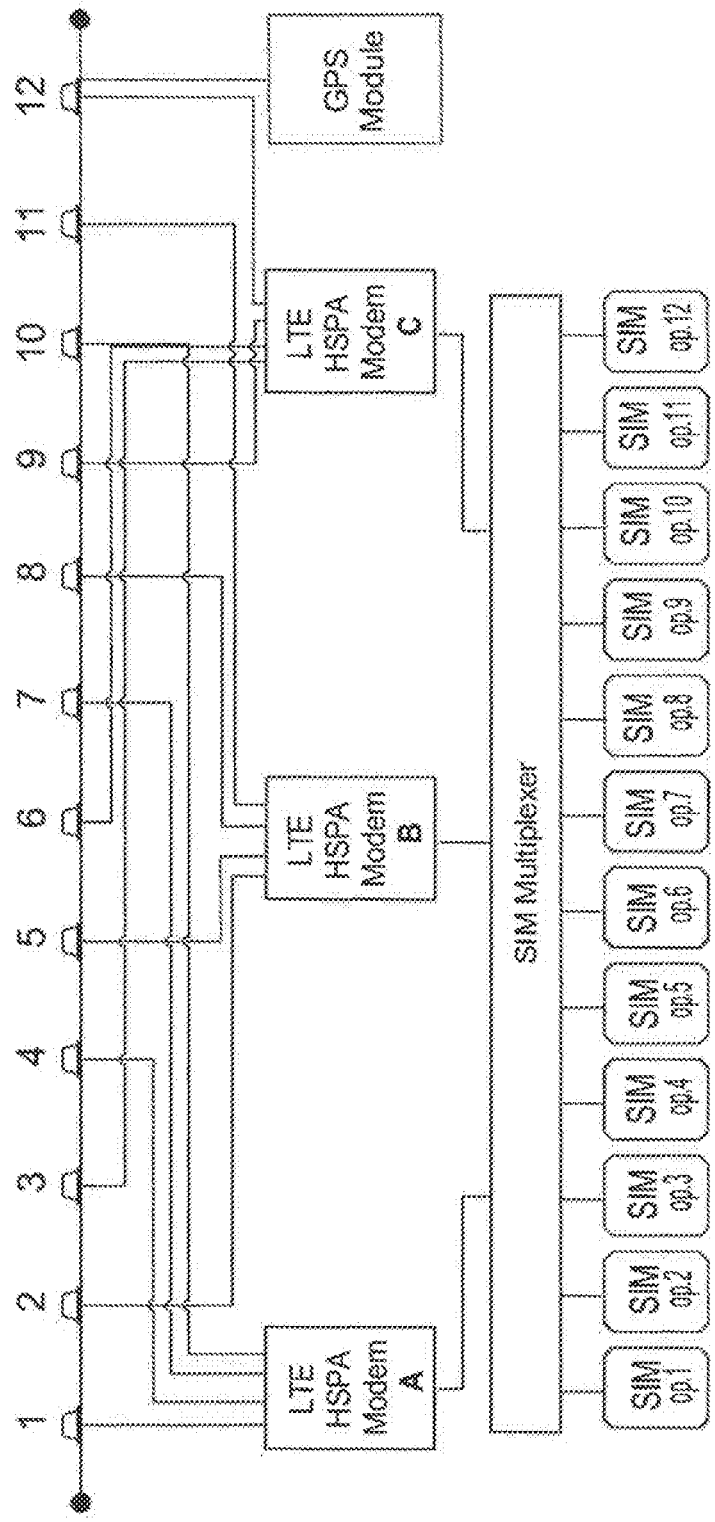

The modems may be connected to a dedicated SIM. However, it is also possible to provide a SIM pool, and assign different SIMs to different modems at different times. Such a SIM pool system is schematically illustrated in FIG. 3c, in which a pool of SIMs, related to different operators, Op. 1-Op 12, are arranged in a SIM pool, and accessible by a SIM multiplexer to assign any one of the SIMs to any one of the modems A-C.

The separation distance between adjacent antennas on each side of the train is preferably in the range 0.5-5 meters, and preferably in the range 1-3 meters, and most preferably in the range 1.5-2.0 meters. The separation distance between antennas assigned to the same modem on each side of the train is preferably in the range 2-8 meters, and preferably in the range 3-6 meters, and most preferably in the range 4-5 meters.

However, in case the antennas/antenna elements are used for Massive MIMO, beamforming or the like, the distance between the antennas/antenna elements may be much lower, such as being only a few centimeters or even millimeters, allowing a much higher density of antennas/antenna elements.

The invention has now been described with reference to specific embodiments. However, several variations of the communication system are feasible. For example, the window antennas may be realized in various ways, any number of antennas may be provided on each side of the train, and being connected or disconnected from each other, etc. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A wireless communication system for a train, comprising:
    a plurality of antennas arranged on the train;
    at least one router in the train for receiving and transmitting wireless data communication to and from a stationary communication server outside said train through at least one exterior mobile network via said plurality of antennas;
    wherein the antennas are window antennas, arranged integrated in or connected to windowpanes of the train, wherein each windowpane comprises a heat resistant, metallized layer, and wherein the window antennas are distributed over at least two windows on each side of the train.

2. The wireless communication system of claim 1, wherein at least two antennas are provided on each windowpane.

3. The wireless communication system of claim 1, wherein at least 6 antennas are provided on each side of the train.

4. The wireless communication system of claim 1, wherein pairs of antennas on opposite sides of the train are connected to each other by means of hybrid couplers.

5. The wireless communication system of claim 1, wherein antennas on opposite sides of the train are operated separately from each other, by separate modems.

6. The wireless communication system of claim 1, wherein said at least one exterior mobile network provides at least two concurrently useable data links.

7. The wireless communication system of claim 1, wherein the communication via the antennas occurs through Massive Multiple Input Multiple Output.

8. The wireless communication system of claim 1, wherein the communication via the antennas occurs through beam forming.

9. The wireless communication system of claim 1, wherein the window antennas are transparent.

10. The wireless communication system of claim 1, wherein the window antennas are arranged in areas of the windows not provided with heat resistant, metallized layers.

11. The wireless communication system of claim 10, wherein additional heat resistant layers are arranged behind the antennas, and wherein the additional heat resistant layers cover the areas of the windows not provided with heat resistant, metallized layers.

12. The wireless communication system of claim 1, wherein the window antennas are provided in layers outside the heat resistant, metallized layers that are in the windowpanes.

13. The wireless communication system of claim 1, wherein at least 6 antennas are provided on each side of the train, wherein the train communication system comprises plural modems, and wherein each modem is connected to plural antennas.

14. The wireless communication system of claim 13, wherein the antennas connected to different modems are arranged separate from each other, and in an interleaved sequential fashion.

15. A method for wireless communication between a train and a remote server through at least one external mobile network, comprising:
    providing a plurality of antennas;
    arranging the antennas as window antennas, arranged integrated in or connected to windowpanes of the train, wherein each windowpane comprises a heat resistant, metallized layer;
    distributing the window antennas over at least two windows on each side of the train; and
    providing at least one router in the train for receiving and transmitting wireless data communication to and from a stationary communication server outside said train through said at least one exterior mobile network via said plurality of antennas.

* * * * *